United States Patent
Vlasov

(10) Patent No.: US 7,469,085 B1
(45) Date of Patent: Dec. 23, 2008

(54) METHOD AND APPARATUS FOR MINIMIZING PROPAGATION LOSSES IN WAVELENGTH SELECTIVE FILTERS

(75) Inventor: Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/777,023

(22) Filed: Jul. 12, 2007

(51) Int. Cl.
*G02B 6/26* (2006.01)
*G02B 6/42* (2006.01)

(52) U.S. Cl. .............................. 385/50; 385/15; 385/30

(58) Field of Classification Search ................ 385/14, 385/15, 27, 30, 50
See application file for complete search history.

(56) References Cited

U.S. PATENT DOCUMENTS

| | | | | |
|---|---|---|---|---|
| 5,446,573 A | * | 8/1995 | Lomashevitch et al. ..... | 398/175 |
| 6,665,476 B2 | * | 12/2003 | Braun et al. .................. | 385/50 |
| 6,818,468 B2 | * | 11/2004 | Morse .......................... | 438/49 |
| 6,947,642 B2 | * | 9/2005 | Yamazaki .................... | 385/39 |
| 7,031,563 B2 | * | 4/2006 | Block et al. .................. | 385/15 |
| 7,231,123 B2 | * | 6/2007 | Sugita et al. ................ | 385/129 |
| 2005/0213873 A1 | | 9/2005 | Piede et al. .................. | 385/14 |
| 2008/0089367 A1 | * | 4/2008 | Srinivasan et al. ........... | 372/19 |

OTHER PUBLICATIONS

Tishinin et al, "Vertical Resonant Couplers with Precise Coupling Efficiency Control Fabricated by Wafer Bonding," IEEE Photonics Technology Lei-Fers, vol. 11, No. 8, Aug. 1999.*
Tishinin, et al, "Vertical Resonant Couplers with Precise Coupling Efficiency Control Fabricated by Wafer Bonding," IEEE Photonics Technology Letters, vol. 11, No. 8, Aug. 1999.

* cited by examiner

*Primary Examiner*—Sung Pak
*Assistant Examiner*—Daniel Petkovsek

(57) ABSTRACT

The present invention is a method and an apparatus for minimizing losses in wavelength selective filters. In one embodiment, an apparatus includes a waveguide bus defined in a first crystalline layer of the apparatus, for receiving incoming light, a resonator defined in the first crystalline layer, and a coupling structure defined in a second polysilicon or amorphous silicon layer of the apparatus, for coupling a selected wavelength of the incoming light from the waveguide bus to the resonator.

2 Claims, 3 Drawing Sheets

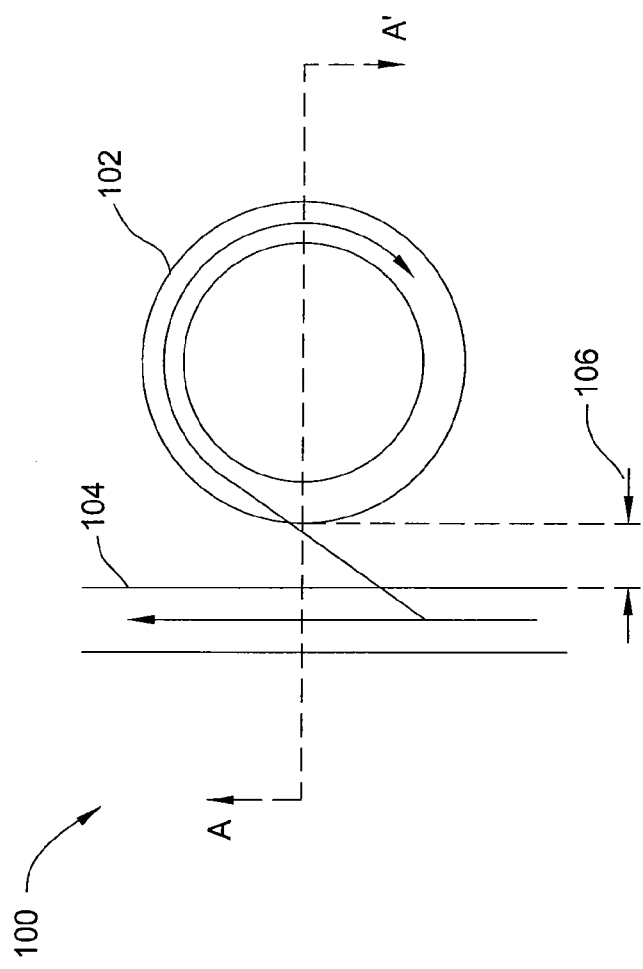
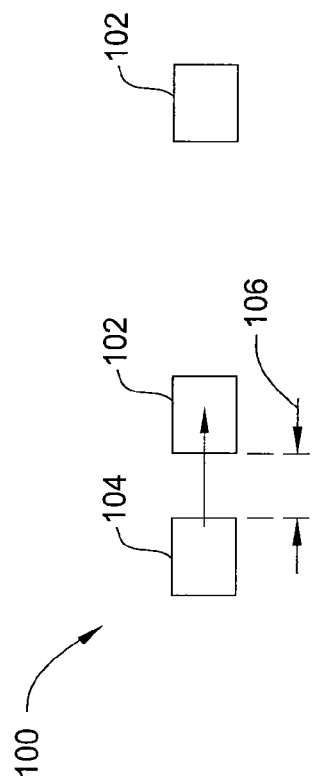
FIG 1A (PRIOR ART)
FIG 1B

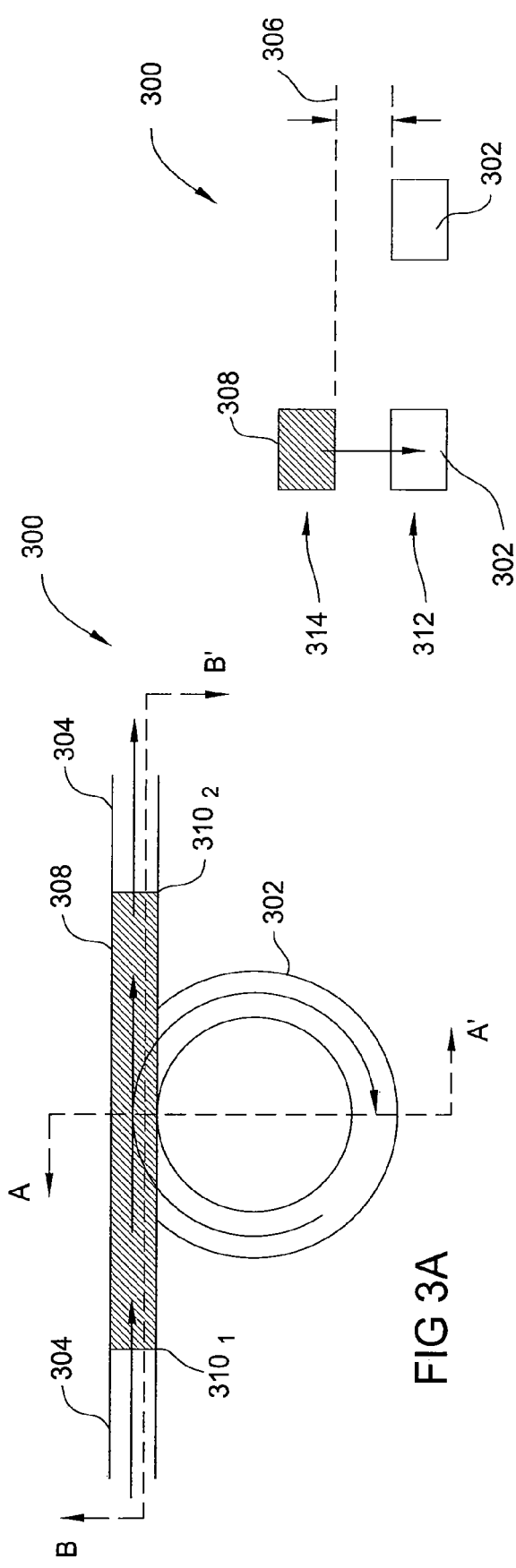
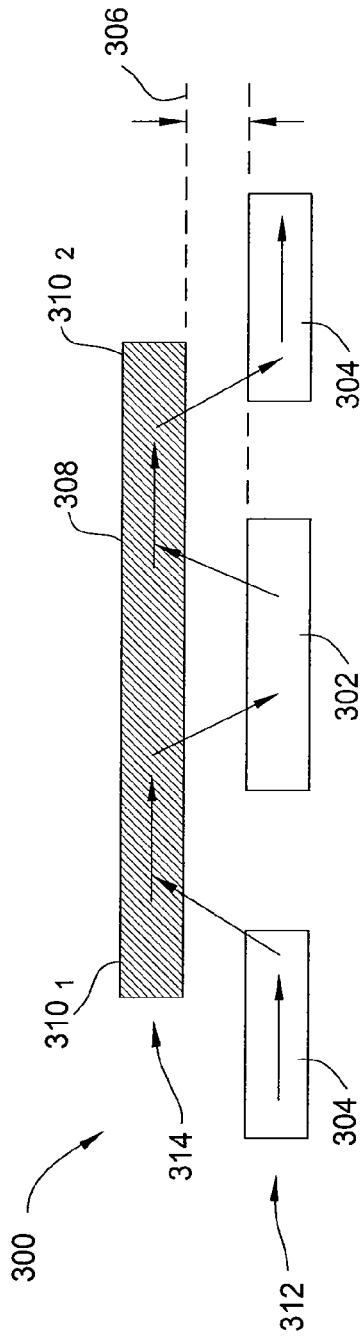
FIG 3A
FIG 3B
FIG 3C

METHOD AND APPARATUS FOR MINIMIZING PROPAGATION LOSSES IN WAVELENGTH SELECTIVE FILTERS

BACKGROUND

The invention relates generally to optics, and relates more particularly to optical interconnects.

FIG. 1A illustrates a top view of one example of a conventional wavelength selective filter 100 (e.g., such as those used for wavelength division multiplexing). FIG. 1B illustrates a cross sectional view of the filter 100 of FIG. 1A, taken along line A-A'. The filter 100 includes a ring resonator 102 side-coupled to an access straight waveguide (or waveguide bus) 104. The ring resonator 102 is tuned to a wavelength channel of interest, such that the ring resonator 102 filters this channel from the bus 104. For high refractive index contrast planar lightwave waveguides and circuits, the coupling gap 106 (i.e., the distance that separates the ring resonator 102 from the bus 104) is typically on the order of a micrometer and controlled within a few nanometers of precision. Such control, however, is difficult to achieve by typical lithography methods.

FIG. 2A illustrates a top view of an alternative example of a conventional wavelength selective filter 200. FIG. 2B illustrates a cross sectional view of the filter 200 of FIG. 2A, taken along line A-A'. Like the filter 100, the filter 200 includes a ring resonator 202 coupled to a waveguide bus 204. However, as illustrated in FIG. 2B, the ring resonator 202 is formed in a high refractive index waveguiding layer that is separate from the layer in which the bus 204 is formed. In this case, the coupling gap 206 is vertically disposed and can be precisely controlled by an amount of gap material grown, for example, by molecular-beam epitaxy (MBE).

For silicon on insulator (SOI)-based planar lightwave circuits based on strip silicon single-mode waveguides with sub-micron cross sections, the approach illustrated in FIGS. 1A and 1B results in a coupling gap on the order of 100 nanometers, which should be controlled with nanometer precision. This makes fabrication tolerances very difficult to maintain. Applying the alternative approach illustrated in FIGS. 2A and 2B would require the growth of an oxide or other low refractive index material on top of the SOI structure to form the coupling gap, followed by growth of an additional top silicon layer for the ring resonator. This is likely to result in a polycrystalline or amorphous silicon structure on top of the silicon layer, which can lead to significant propagation losses (e.g., approximately twenty dB/cm) due to scattering on the grain boundaries. Losses are increased proportionally to the photon lifetime (inverse of the ring resonator quality factor) if the ring resonator or other resonator structure is located on the top layer of the circuit.

Thus, there is a need for a method and an apparatus for minimizing propagation losses in wavelength selective filters.

SUMMARY OF THE INVENTION

The present invention is a method and an apparatus for minimizing losses in wavelength selective filters. In one embodiment, an apparatus includes a waveguide bus defined in a first crystalline layer of the apparatus, for receiving incoming light, a resonator defined in the first crystalline layer, and a coupling structure defined in a second polysilicon or amorphous silicon layer of the apparatus, for coupling a selected wavelength of the incoming light from the waveguide bus to the resonator.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 1A illustrates a top view of one example of a conventional wavelength selective filter;

FIG. 1B illustrates a cross sectional view of the filter of FIG. 1A, taken along line A-A';

FIG. 3A is a top view of one embodiment of a wavelength selective filter, according to the present invention;

FIG. 3B is a cross sectional view of the filter of FIG. 3A, taken along line A-A'; and FIG. 3C is a cross sectional view of the filter of FIG. 3A taken along line B-B'.

To facilitate understanding, identical reference numerals have been used, where possible, to designate identical elements that are common to the figures.

DETAILED DESCRIPTION

Figure 2A:
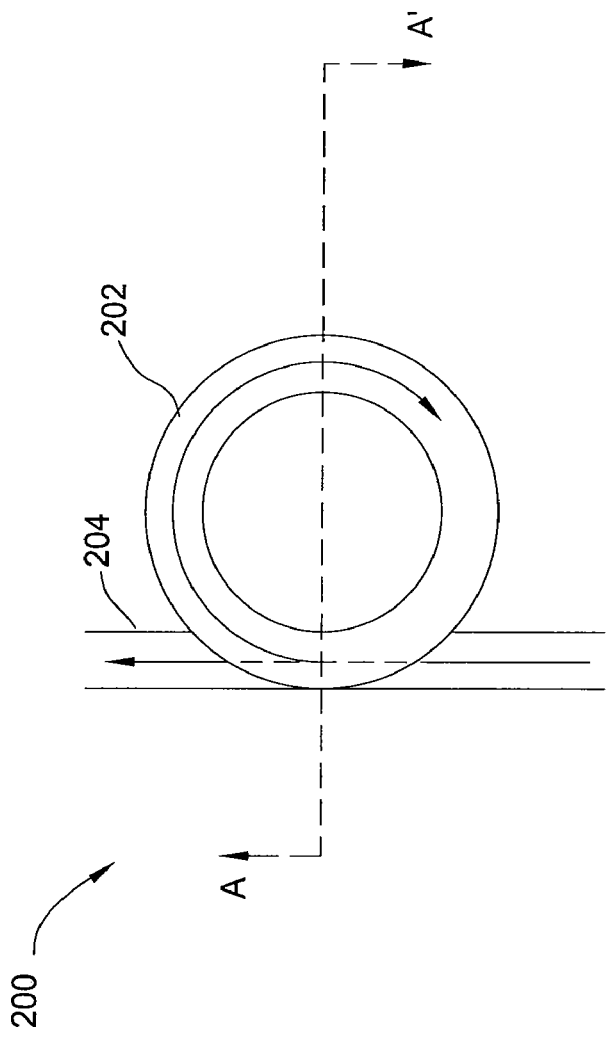
FIG. 2A illustrates a top view of an alternative example of a conventional wavelength selective filter.
Figure 2B:
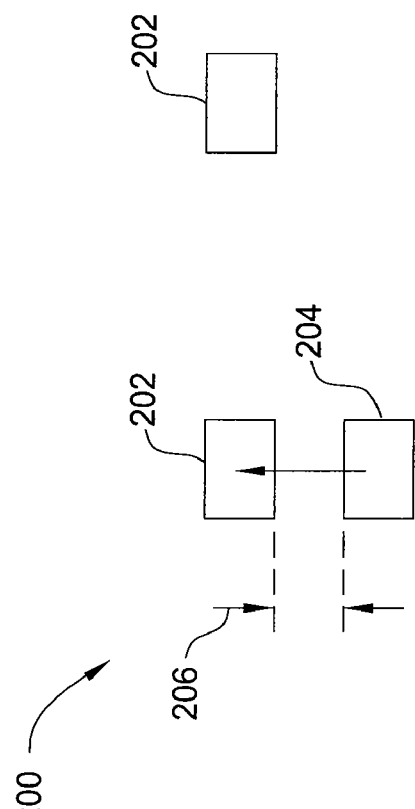
FIG. 2B illustrates a cross sectional view of the filter of FIG. 2A, taken along line A-A'.

In one embodiment, the present invention is a method and an apparatus for minimizing propagation losses in wavelength selective filters. Embodiments of the present invention vertically couple a waveguide bus to a resonator using a straight polysilicon waveguide section with lateral tapers, where the waveguide bus and the resonator are located on a common crystalline layer of an SOI wafer.

FIG. 3A is a top view of one embodiment of a wavelength selective filter 300, according to the present invention. FIG. 3B is a cross sectional view of the filter 300 of FIG. 3A, taken along line A-A'. FIG. 3C is a cross sectional view of the filter 300 of FIG. 3A taken along line B-B'. Referring simultaneously to FIGS. 3A-3C, the filter 300 comprises a resonator (e.g., a ring resonator) 302, a waveguide bus 304 and a coupling structure 308.

The resonator 302 and the waveguide bus 304 are defined in a first, common crystalline layer 312 of the SOI wafer of the filter 300. The coupling structure 308 is defined in a second layer 314 of the filter 300, located in one embodiment above the first layer 312. In one embodiment, the second layer comprises polysilicon or amorphous silicon. The coupling structure 308 comprises a substantially straight waveguide having lateral adiabatic tapers $310_1$-$310_2$ (hereinafter collectively referred to as "tapers 310") at each end. The tapers 310 are configured for coupling incoming light between the coupling structure 308 and the waveguide bus 304 or the resonator 302.

Specifically, incoming light is received in the first layer 312 of the filter 300 by a first section of the waveguide bus 304. As the light propagates through the waveguide bus 304, it is coupled to the coupling structure 308 in the second layer 314 of the filter 300, via a first taper $310_1$. The light then propagates through the coupling structure 308 until the light reaches the resonator 302, where the selected wavelength is coupled to the resonator 302. The remainder of the light (i.e., wavelengths other than the selected wavelength) continues to propagate along the coupling structure 308 until the light reaches a second taper 310$_2$, by which the remainder of the light is coupled back to the waveguide bus 304.

The filter 300 is thereby configured to control the coupling gap 306 between the resonator 302 and the waveguide bus 304 by growth (e.g., of oxide or other low refractive index material). However, propagation losses in this case are minimized because the optical mode of incoming light propagates in the polysilicon or amorphous silicon top layer (i.e., second layer 314) for only a very short relative distance, and no further substantial losses due to the resonator 302 occur.

Thus, the present invention represents a significant advancement in the field of optics. Embodiments of the present invention provide a coupling section (e.g., a straight poly-silicon waveguide section with lateral tapers) by which a waveguide bus is vertically coupled to a resonator. The gap between the bus and the resonator can be tightly controlled, while propagation losses are minimized.

While foregoing is directed to the preferred embodiment of the present invention, other and further embodiments of the invention may be devised without departing from the basic scope thereof, and the scope thereof is determined by the claims that follow.

The invention claimed is:

1. A method for filtering light of a selected wavelength from incoming light, comprising:

receiving the incoming light via a waveguide bus located in a first crystalline layer of a wavelength selective filter;

coupling the light from the waveguide bus to a coupling structure located in a second layer of the wavelength selective filter; and coupling light of the selected wavelength from the coupling structure to a resonator located in the first crystalline layer, wherein the coupling structure comprises:

at least one lateral, adiabatic taper for coupling the incoming light between the coupling structure and the waveguide bus or between the coupling structure and the resonator.

2. A method for filtering light of a selected wavelength from incoming light, comprising:

receiving the incoming light via a waveguide bus located in a first crystalline layer of a wavelength selective filter;

coupling the light from the waveguide bus to a coupling structure located in a second layer of the wavelength selective filter;

coupling light of the selected wavelength from the coupling structure to a resonator located in the first crystalline layer, wherein a coupling gap is formed between the first crystalline layer and the second layer; and controlling the coupling gap by oxide growth.

* * * * *